(12) United States Patent
Surprise et al.

(10) Patent No.: US 8,413,115 B1
(45) Date of Patent: Apr. 2, 2013

(54) SPECIFYING INTEGRATION POINTS OF A SYSTEM-OF-SYSTEMS

(75) Inventors: Jason M. Surprise, Allen, TX (US);
Kristina L. Stewart, Clearwater, FL (US); Stephen P. Marra, Palm Harbor, FL (US); Suzanne P. Hassell, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 877 days.

(21) Appl. No.: 12/548,481

(22) Filed: Aug. 27, 2009

Related U.S. Application Data

(60) Provisional application No. 61/092,670, filed on Aug. 28, 2008.

(51) Int. Cl.
*G06F 9/44* (2006.01)

(52) U.S. Cl. ........ 717/121; 717/100; 717/103; 717/106; 717/123; 710/105; 709/230; 716/136

(58) Field of Classification Search .................. None
See application file for complete search history.

(56) References Cited

U.S. PATENT DOCUMENTS

| | | | | |
|---|---|---|---|---|
| 5,630,163 | A * | 5/1997 | Fung et al. ..................... | 710/307 |
| 5,959,536 | A * | 9/1999 | Chambers et al. ............. | 710/104 |
| 6,212,649 | B1 * | 4/2001 | Yalowitz et al. ................ | 714/31 |
| 6,237,041 | B1 * | 5/2001 | Haal et al. ..................... | 709/246 |
| 6,968,438 | B1 * | 11/2005 | Russo et al. ................... | 711/170 |
| 7,020,697 | B1 * | 3/2006 | Goodman et al. ............. | 709/223 |
| 7,350,184 | B2 * | 3/2008 | Upton ............................ | 717/100 |
| 7,665,064 | B2 * | 2/2010 | Able et al. ..................... | 717/117 |
| 7,765,521 | B2 * | 7/2010 | Bryant ........................... | 717/103 |
| 7,890,809 | B2 * | 2/2011 | Nye et al. ...................... | 705/7.11 |
| 7,908,020 | B2 * | 3/2011 | Pieronek ........................ | 700/19 |
| 2001/0052108 | A1 * | 12/2001 | Bowman-Amuah ............ | 717/1 |
| 2002/0165745 | A1 * | 11/2002 | Greene et al. ................. | 705/7 |
| 2003/0145124 | A1 * | 7/2003 | Guyan et al. .................. | 709/318 |
| 2004/0045001 | A1 * | 3/2004 | Bryant ........................... | 718/100 |
| 2004/0111699 | A1 * | 6/2004 | Rockwell ....................... | 717/103 |
| 2004/0194060 | A1 * | 9/2004 | Ousterhout et al. ........... | 717/120 |
| 2005/0005261 | A1 * | 1/2005 | Severin ......................... | 717/108 |
| 2007/0061799 | A1 * | 3/2007 | Kimmerly ...................... | 717/168 |
| 2007/0121542 | A1 * | 5/2007 | Lohr et al. ..................... | 370/329 |
| 2007/0239819 | A1 * | 10/2007 | Woods et al. ................. | 709/201 |
| 2008/0104569 | A1 * | 5/2008 | Gilfix et al. .................... | 717/104 |
| 2010/0214313 | A1 * | 8/2010 | Herman et al. ................ | 345/593 |
| 2012/0017262 | A1 * | 1/2012 | Kapoor et al. ................. | 726/1 |

OTHER PUBLICATIONS

Title: An integration-oriented approach for designing communication protocols from component-based service specifications, author: M Nakamura, dated: 1996, source: IEEE.*
Title: Multiple protocol network integration: A case study in internetworking with IP/IPX, author: Pappa, S source: IEEE, dated: 1992.*
Clements, Paul, et al., "*Evaluating Software Architectures: Methods and Case Studies*", InformIT: Evaluating Software Architectures: Methods and Case Studies, http://www.informit.com/store/product.aspx?isbn=020170482X, 16 pages, Oct. 22, 2001.
Nolte, William L., et al., "*Technology Readiness Calculator*", www.dtic.mil/ndia/2003systems/nolte2.pdf, 16 pages, Oct. 24, 2003.

* cited by examiner

*Primary Examiner* — Chameli Das
(74) *Attorney, Agent, or Firm* — Schwegman Lundberg & Woessner, P.A.

(57) ABSTRACT

In accordance with certain embodiments of the present disclosure, specifying integration points of a system-of-systems includes identifying an integration point that associates interfaces of system components. The integration point is characterized according to the identification to generate a set of attributes describing the interfaces. The integration point is specified according to the set of attributes.

20 Claims, 5 Drawing Sheets

216

| DATA CONSUMERS | SYSTEM / SYSTEM NODE | DATA PRODUCERS — C2I_Trk_Glue1 | | Rdr_Glue1 | |
|---|---|---|---|---|---|
| | | SECTOR HQ | REGIONAL HQ | SURVEILLANCE TOWER | SURVEILLANCE VEHICLE |
| C2I_Trk_Glue1 | SECTOR HQ | | | 7 | 7 |
| | REGIONAL HQ | | | 7 | 7 |
| Rdr_Glue1 | SURVEILLANCE TOWER | | | | |
| | SURVEILLANCE VEHICLE | | | | |

*FIG. 6*

| TRL/ITRL RATING | DoD PRODUCT TRL DEFINITIONS | ITRL DEFINITIONS |
|---|---|---|
| 1 | BASIC PRINCIPLES OBSERVED AND REPORTED | THE INTERFACE TECHNOLOGY IS NEW AND UNPROVEN |
| 2 | TECHNOLOGY CONCEPT AND/OR APPLICATION FORMULATED | THE INTERFACE TECHNOLOGY IS NEW BUT APPLICATIONS FOR ITS USE HAVE BEEN IDENTIFIED |
| 3 | ANALYTICAL AND EXPERIMENTAL CRITICAL FUNCTION AND/OR CHARACTERISTIC PROOF OF CONCEPT | THE INTERFACE TECHNOLOGY HAS BEEN EXPERIMENTED WITH IN THE LAB BUT HAS NOT BEEN FIELDED IN ANY REAL SYSTEMS |
| 4 | COMPONENT AND/OR BREADBOARD VALIDATION IN LABORATORY ENVIRONMENT | THE INTERFACE TECHNOLOGY HAS BEEN USED TO INTERFACE OUR TWO SYSTEMS IN A LAB ENVIRONMENT BUT THE SYSTEMS HAVE NEVER BEEN DEPLOYED TOGETHER USING THIS TECHNOLOGY |
| 5 | COMPONENT AND/OR BREADBOARD VALIDATION IN RELEVANT ENVIRONMENT | THE INTERFACE TECHNOLOGY HAS BEEN USED TO INTERFACE OUR TWO SYSTEMS IN A DIFFERENT SoS DESIGNED FOR DIFFERENT MISSION CONDITIONS AS COMPARED TO THE SoS BEING DEVELOPED |
| 6 | SYSTEM/SUBSYSTEM MODEL OR PROTOTYPE DEMONSTRATION IN A RELEVANT ENVIRONMENT | THE INTERFACE TECHNOLOGY HAS BEEN USED TO INTERFACE OUR TWO SYSTEMS IN A DIFFERENT SoS DESIGNED FOR SIMILAR MISSION CONDITIONS AS COMPARED TO THE SoS BEING DEVELOPED |
| 7 | SYSTEM PROTOTYPE DEMONSTRATION IN AN OPERATIONAL ENVIRONMENT | THE INTERFACE TECHNOLOGY HAS BEEN USED TO INTERFACE OUR TWO SYSTEMS IN A DEMO OF THE SoS BEING DEVELOPED |
| 8 | ACTUAL SYSTEM COMPLETED AND QUALIFIED THROUGH TEST AND DEMONSTRATION | THE INTERFACE TECHNOLOGY HAS BEEN USED TO INTERFACE OUR TWO SYSTEMS IN THE FINAL INTEGRATION LAB ENVIRONMENT OF THE SoS BEING DEVELOPED |
| 9 | ACTUAL SYSTEM PROVEN THROUGH SUCCESSFUL MISSION OPERATIONS | THE INTERFACE TECHNOLOGY HAS BEEN USED TO INTERFACE OUR TWO SYSTEMS IN THE FINAL DEPLOYED SoS |

SPECIFYING INTEGRATION POINTS OF A SYSTEM-OF-SYSTEMS

RELATED APPLICATIONS

This application claims priority to U.S. Provisional Patent Application Ser. No. 61/092,670 entitled "DESCRIPTION OF INTEGRATION POINTS OF A SYSTEM-OF-SYSTEMS," which was filed on Aug. 28, 2008. U.S. Provisional Patent Application Ser. No. 61/092,670 is hereby incorporated by reference.

TECHNICAL FIELD

This invention relates generally to the field of system architecture and more specifically to specifying integration points of a system-of-systems.

BACKGROUND

Developing an architecture of a system involves defining the relationships of the system. Designing the system extends the architecture by developing models of the structure and operation of the system. During the architecture and design phases, interfaces among components of the system may be developed.

SUMMARY OF THE DISCLOSURE

In accordance with the present invention, disadvantages and problems associated with previous techniques for transitioning from system architecture to design in the development of a system may be reduced or eliminated.

In accordance with certain embodiments of the present disclosure, specifying integration points of a system-of-systems includes identifying an integration point that associates interfaces of system components. The integration point is characterized according to the identification to generate a set of attributes describing the interfaces. Requirements of the integration point are specified according to the set of attributes.

Certain embodiments of the invention may provide one or more technical advantages. A technical advantage of one embodiment may be that integration points may link system architecture and interface design. This may reduce duplication of effort and improve consistency of the results.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 6 illustrates an example of a matrix that may be used to display information about integration points; and FIG. 7 illustrates an example of interface maturity levels that may be used in the method of FIG. 4.

DETAILED DESCRIPTION OF THE DRAWINGS

Figure 1:
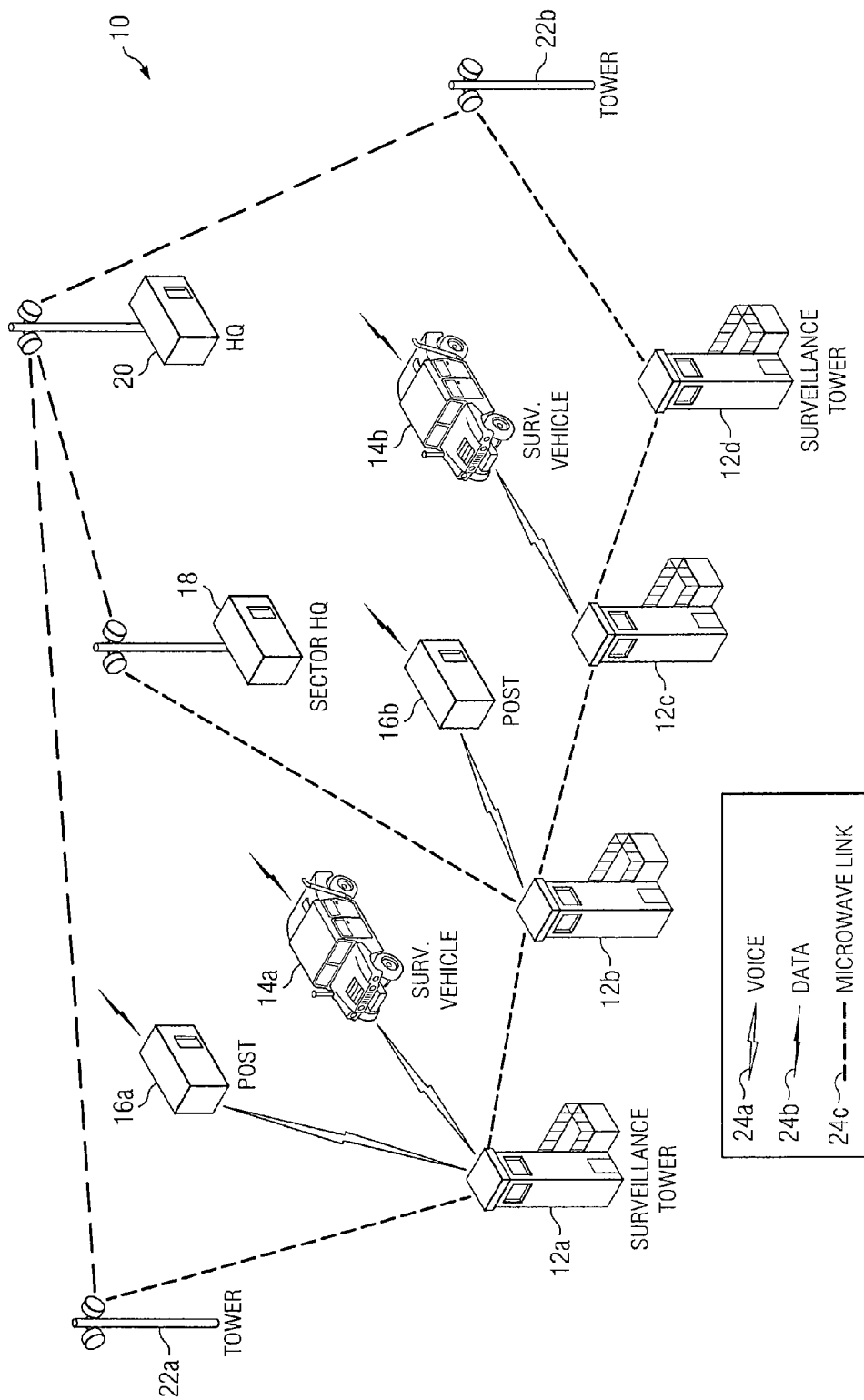
FIG. 1 illustrates one embodiment of a system for which integration points may be specified.

FIG. 1 illustrates one embodiment of a system 10 for which integration points may be specified. In certain embodiments, specifying integration points may include identifying an integration point associating interfaces of system components. The integration point is characterized according to the identification to generate a set of attributes describing the interfaces. Requirements of the integration point are specified according to the set of attributes.

In the illustrated embodiment, system 10 may represent any suitable system that includes system components that communicate with each other, or a system-of-systems. For example, system 10 may represent a border security system-of-systems. In the illustrated embodiment, system 10 includes a plurality of nodes. Examples of nodes include surveillance towers 12 (12a-12d), surveillance vehicles 14 (14a-14b), command posts 16 (16a-16b), a sector headquarters 18, a headquarters 20, existing towers 22 (22a-22b), or other suitable node. A node may be a physical collection of one or more entities that can communicate with other nodes via a communication link 24. Examples of communication links include a voice link 24a (for example, a very high frequency (VHF) tactical link), a data link 24b (for example, a cellular link) a microwave link 24c, an existing 24d, or other suitable link operable to communicate signals between nodes.

A node may operate as a host platform for system components that allow the node to communicate within the node or with other nodes. A system component may include any suitable equipment, for example, commercial off-the-shelf (COTS) equipment or custom equipment. In the example, surveillance towers 12 and surveillance vehicles 14 may each include a radar system as a system component, and sector headquarters 18 may include a track manager system as a system component that receives tracking data from the radar systems.

An integration point associates interfaces of system components to allow that system components to communicate (for example, exchange data). An integration point may describe the interfaces between system components. The interfaces may be between hardware to hardware, hardware to software, or software to software. An integration point may be used to generate interface specification requirements. Different combinations of system components may have different integration points.

In the example, the radar systems and the track manager system communicate through surveillance tower 12 and a surveillance vehicle 14. There are two integration points between the radar system and the track manager system: one integration point is between the surveillance tower 12 and the sector headquarters 18, and the other integration point is between surveillance vehicle 14 and sector headquarters 18. Integration points are described in more detail with reference to FIG. 2.

A glue code system allows system components to exchange information. Examples of glue code systems include adaptors and translators. Glue code systems may perform other suitable operations, for example, debug interface problems, support integration and test interface monitoring, allow for insertion of simulators, and/or minimize the impact of replacing a component system.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 2:
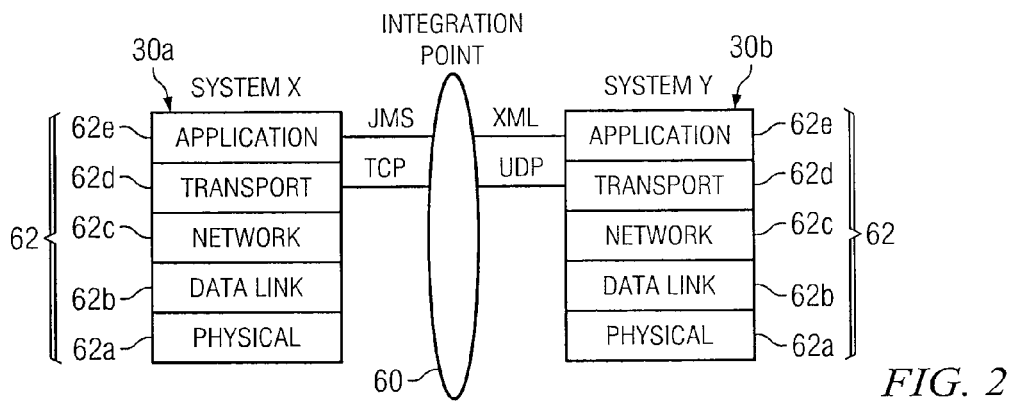
FIG. 2 illustrates an example of an integration point that couples system components.

FIG. 2 illustrates an example of an integration point (IP) 60 that couples system components 30*a-b*. In the illustrated embodiment, system component 30 includes protocol layers 62 (62*a*-62*e*). Protocol layers 62 include a physical layer 62*a*, a data link layer 62*b*, a network layer 62*c*, a transport layer 62*d*, and an application layer 62*e*.

Integration point 60 may operate to couple one or more protocol layers 62 between the system components 30. In the illustrated example, integration point 60 couples the application layers 62*e* and the transport layers 62*d*. In certain situations, a tracking system and a radar system may be separated over a network, so they may exchange data at the application and transport layers, while intervening nodes handle the lower protocol layers. Communication systems may exchange data at no higher than network layer 62*c*. System components 30 that are physically connected to each other may at least exchange data at the physical and data link layers 62*a* and 62*b* in addition to higher protocol layers.

Figure 3:
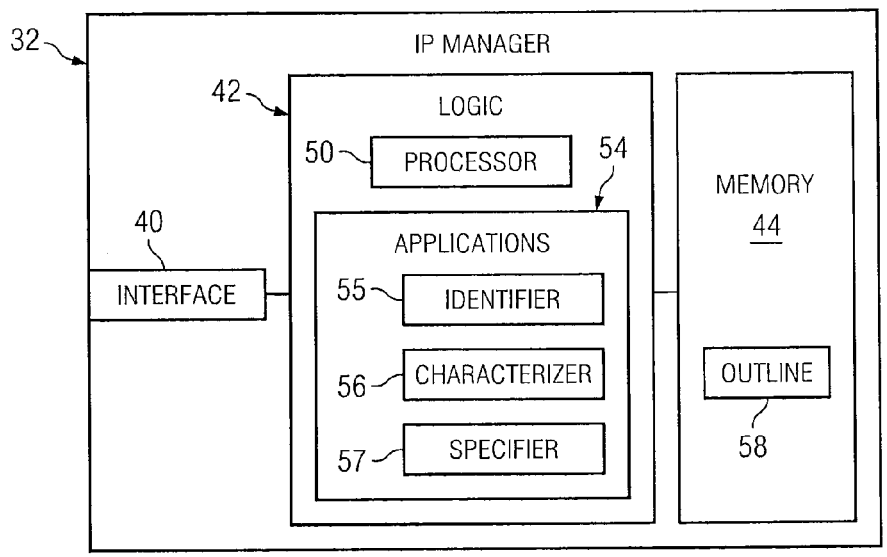
FIG. 3 illustrates an example of an integration point manager that may be used for the system of FIG. 1.

FIG. 3 illustrates an example of an integration point manager 32 that may be used for system 10 of FIG. 1. In the example, integration point manager 32 includes an interface 40, logic 42, and a memory 44. Logic includes a processor 50 and applications 54. Examples of applications include an identifier 55, a characterizer 56, and a specifier 57. Memory 44 stores a requirement specification outline 58.

In certain embodiments, identifier 55 identifies an integration point. Identifiers 55 may identify an integration point by identifying features of the integration point that affect communication between system components. Examples of such features include the type of system components 30 (for example, COTS, custom, or other type such as in FIG. 1), the type of glue code system, the interconnection between system components 30, the system nodes in which the system components 30 are deployed, the protocol layers that are exchanging data, and the interfaces between system component 30.

Characterizer 56 characterizes the integration point according to the identified integration point to generate a set of attributes that describe the interfaces. An attribute may be relevant in determining the risk that the integration point poses to the successful operation of system 10. Accordingly, characterizer 56 may identify integration points that pose the greatest risk. Examples of attributes include the criticalness of data flows between system components 30, the maturity level of an interface, protocol, or system component, the data standards (for example, commercial, government, or proprietary standards) used at each layer, the node that hosts the system component 30, the integration point type (for example, internodal or intranodal), the protocol standards and technologies used at each protocol layer, and/or other suitable attribute.

Attributes may be generated according to any suitable feature of the integration point. In certain cases, a feature may indicate a function or environment of a node, so attributes compatible with the function of the node may be generated. For example, if the integration point 16 is associated with a mobile surveillance vehicle, the attributes may take into account the movement of the vehicle. As another example, if the integration point 16 is associated with a node subject to extreme environmental conditions, the attributes may take into account these conditions. In other cases, a feature may indicate the criticality of an integration point, so the attributes compatible with the criticality may be generated. For example, if the integration point is associated with critical data flows and/or lower maturity levels, the attributes may provide a higher priority.

Different types of attributes may be generated for different types of integration points, such as different combinations of system components. For example, a first set of attributes may be generated if the integration point associates a first system component deployed in a first type of node. A second set of attributes may be generated if the integration point associates the first system component deployed in a second type of node.

Figure 4:
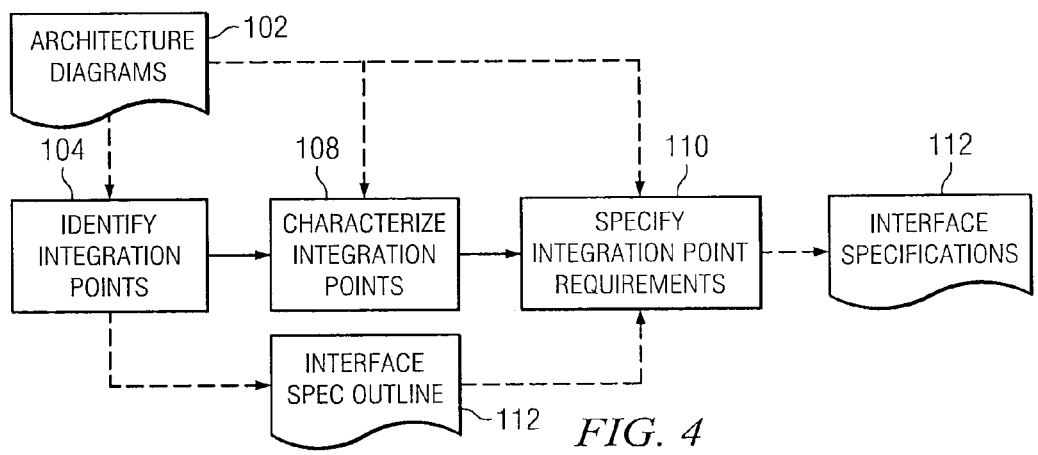
FIG. 4 illustrates an example of a method for specifying integration points in a system.

Specifier 57 specifies integration point according to the set of attributes. The specifier may specify the integration point by generating requirements specification according to a requirement specification outline 58. The requirements specification may describe features identified by identifier 55 and attributes generated by characterizer 56. For example, the requirements specification may report requirements for one or more protocol layers of the integration point FIG. 4 illustrates an example of a method for specifying integration points in a system 10. In the method, diagrams 102 that include information about system 10 are displayed. Examples of techniques for displaying information associated with the integration points are described in more detail with reference to FIGS. 5 and 6. The diagrams may be updated as more information about system 10 is gathered.

The method starts at step 104, where integration points are identified. Information identifying the integration points of system 10 may be documented in any suitable manner. As an example, information may be entered into one or more worksheets. For example, information may be entered into a products, integration points, and critical data flows worksheets. The worksheets may be generated using any suitable software, such as MICROSOFT EXCEL Examples of the worksheets are shown below. In certain embodiments, the product worksheet may be generated from the diagrams of FIG. 5.

| Products Worksheet | | | | | |
|---|---|---|---|---|---|
| Product ID | Product | Product Vendor | System Type | Product Classification | Product Deployments |
| C2I_Trk_Mgr | Track Manager Interface Engine | AAA | Mission System | COTS | Regional HQ, Sector HQ |
| LSS_Rdr | Radar | BBB | Mission System | COTS | Surveillance Tower, Mobile Surveillance Vehicle |
| Rdr_Glue1 | Radar Adapter SW | CCC | Mission System | Custom | Surveillance Tower, Mobile Surveillance Vehicle |
| C2I_Trk_Glue1 | C2I Track Manager Adapter SW | DDD | Mission System | Custom | Regional HQ, Sector HQ |

| Interface Worksheet | | | | | |
|---|---|---|---|---|---|
| End-to-End Interface | Interfaces | Spec Needed? | Product A ID | Product B ID | Product Integration Points (SV-1) |
| C2 Track Correlator-to-Radar | C2 Track Correlator Adapter - Radar Adapter | Yes | C2I_Trk_Glue1 | Rdr_Glue1 | Surveillance Tower - Post Surveillance Tower - Sector HQ Mobile Surveillance Vehicle - Post Mobile Surveillance Vehicle - Sector HQ |
| | Radar - Radar Adapter | Yes | LSS_Rdr | Rdr_Glue1 | Surveillance Tower Mobile Surveillance Vehicle |

| Data Flow Worksheet | | | | |
|---|---|---|---|---|
| Data Element ID | Data Element Name | Data Type | Description | Security Class |
| LSS_Rdr_Trk | Radar Track | Mission Data | Track data generated by the Radar. | Unclassified |
| Rdr_Adapt_Trk | Radar Adapter Track | Mission Data | Track data received from the radar that is converted to standard format and units. | Unclassified |
| Corr_Adapt_Trk | C2 Track Correlator Track | Mission Data | Track data received from the radar adapter that is reformatted to the C2 Track Correlator format | Unclassified |

| Source Product ID | Destination Product ID | Applicable Integration Points |
|---|---|---|
| LSS_Rdr | Rdr_Glue1 | Surveillance Tower Mobile Surveillance Vehicle |
| Rdr_Glue1 | C2I_Trk_Glue1 | Surveillance Tower - Post Surveillance Tower - Sector HQ Mobile Surveillance Vehicle - Post Mobile Surveillance Vehicle - Sector HQ |
| C2I_Trk_Glue1 | C2I_Trk_Mgr | Regional HQ - Regional HQ Sector HQ - Sector HQ |

Integration points are characterized at step 108 according to the identified features to generate attributes that indicate which integration points pose the most risk during system development. The characterizations of the interfaces may be added to the worksheets as shown below.

| Updated Products Worksheet | | | | | |
|---|---|---|---|---|---|
| | | | Application Layer | | |
| Product Integration Points (SV-1) | Integration Point Type | ITRL | Integrated at Application Layer? | Data Format | Applicable Standards and Technologies |
| Surveillance Tower-Post | Inter-Nodal | 4 | Yes | Commercial Stnds and Proprietary | JMS, XML |
| Surveillance Tower - Sector HQ | Inter-Nodal | 4 | Yes | Commercial Stnds and Proprietary | JMS, XML |
| Mobile Surveillance Vehicle - Post | Inter-Nodal | 4 | Yes | Commercial Stnds and Proprietary | JMS, XML |
| Mobile Surveillance Vehicle - Sector HQ | Inter-Nodal | 4 | Yes | Commercial Stnds and Proprietary | JMS, XML |
| Surveillance Tower | Intra-Nodal | 7 | Yes | Commercial Stnds and Proprietary | HTTP, XML |
| Mobile Surveillance Vehicle | Intra-Nodal | 7 | Yes | Commercial Stnds and Proprietary | HTTP, XML |

| Updated Products Worksheet | | | | | |
|---|---|---|---|---|---|
| | | | Transport Layer | | |
| Product Integration Points (SV-1) | Integration Point Type | ITRL | Integrated at Transport Layer? | Data Format | Applicable Standards and Technologies |
| Surveillance Tower - Post | Inter-Nodal | 4 | Yes | Commercial Stnds | TCP, UDP |
| Surveillance Tower - Sector HQ | Inter-Nodal | 4 | Yes | Commercial Stnds | TCP, UDP |
| Mobile Surveillance Vehicle - Post | Inter-Nodal | 4 | Yes | Commercial Stnds | TCP, UDP |
| Mobile Surveillance Vehicle - | Inter-Nodal | 4 | Yes | Commercial Stnds | TCP, UDP |

-continued

Updated Products Worksheet

| Product Integration Points (SV-1) | Integration Point Type | ITRL | Transport Layer | | Applicable Standards and Technologies |
|---|---|---|---|---|---|
| | | | Integrated at Transport Layer? | Data Format | |
| Sector HQ Surveillance Tower | Intra-Nodal | 7 | Yes | Commercial Stnds | TCP, UDP |
| Mobile Surveillance Vehicle | Intra-Nodal | 7 | Yes | Commercial Stnds | TCP, UDP |

The characterizations may be added to the data flow worksheets as shown below.

| Applicable Integration Points | Data Distribution Scheme (src-to-dest) | Delivery Method | Priority | Max Latency | Periodicity | Freq (Hz) |
|---|---|---|---|---|---|---|
| Surveillance Tower | One-to-One | Reliable | High | TBD | Aperiodic | N/A |
| Mobile Surveillance Vehicle | One-to-One | Reliable | High | TBD | Aperiodic | N/A |
| Surveillance Tower - Post | One-to-One | Reliable | High | TBD | Aperiodic | N/A |
| Surveillance Tower- Sector HQ | One-to-One | Reliable | High | TBD | Aperiodic | N/A |
| Mobile Surveillance Vehicle- Post | One-to-One | Reliable | High | TBD | Aperiodic | N/A |
| Mobile Surveillance Vehicle- Sector HQ | One-to-One | Reliable | High | TBD | Aperiodic | N/A |
| Regional HQ - Regional HQ | One-to-One | Reliable | High | TBD | Aperiodic | N/A |
| Sector HQ - Sector HQ | One-to-One | Reliable | High | TBD | Aperiodic | N/A |

Integration point requirements are specified at step 110. The requirements may include the messaging structure, communication protocol, and performance requirements for each integration point. The requirements may be generated according to an outline 112. Below is an example of an outline of one way of presenting the requirements.

Requirements Specification Outline

1. Scope
　1.1. Identification
　1.2. System Overview
　1.3. Document Overview
2. Referenced Documents
　2.1. Customer Documents
　2.2. Contractor Documents
　2.3. Standards, Handbooks, Specifications
3. Requirements
　3.1. System A deployed in Node X—System B deployed in Node Y Integration Point Interface Requirements
　　3.1.1. Interface Identification and Diagrams
　　3.1.2. Message Definitions
　　　3.1.2.1. System A to System B Messages
　　　3.1.2.2. System B to System A Messages
　　3.1.3. System A to System B Requirements
　　　3.1.3.1. Interface Technology Requirements
　　　　3.1.3.1.1. Application Layer
　　　　3.1.3.1.2. Transport Layer
　　　　3.1.3.1.3. Network Layer
　　　　3.1.3.1.4. Data Link Layer
　　　　3.1.3.1.5. Physical Layer
　　　3.1.3.2. Protocol Requirements
　　　3.1.3.3. Performance Requirements
　　3.1.4. System B to System A Requirements
　　　3.1.4.1. Interface Technology Requirements
　　　　3.1.4.1.1. Application Layer
　　　　3.1.4.1.2. Transport Layer
　　　　3.1.4.1.3. Network Layer
　　　　3.1.4.1.4. Data Link Layer
　　　　3.1.4.1.5. Physical Layer
　　　3.1.4.2. Protocol Requirements
　　　3.1.4.3. Performance Requirements
　3.2. System A deployed in Node W—System B deployed in Node Z Integration Point Interface Requirements
　　3.2.1. Interface Identification and Diagrams In certain embodiments, requirements for one or more integration points may be specified. Any suitable factors may be considered to determine which integration points require specification. As an example, the maturity level may be used to determine which interfaces to select. Integration points with a low maturity level may be selected to be specified, while integration points with a high maturity level may not be selected. As another example, end users may specify integration points for which they would like to have requirement specifications. As another example, higher risk integration points may be selected. The selected integration points may be noted in the interface worksheet.

Interface specifications are reported at step 112. The method then terminates.

Figure 5:
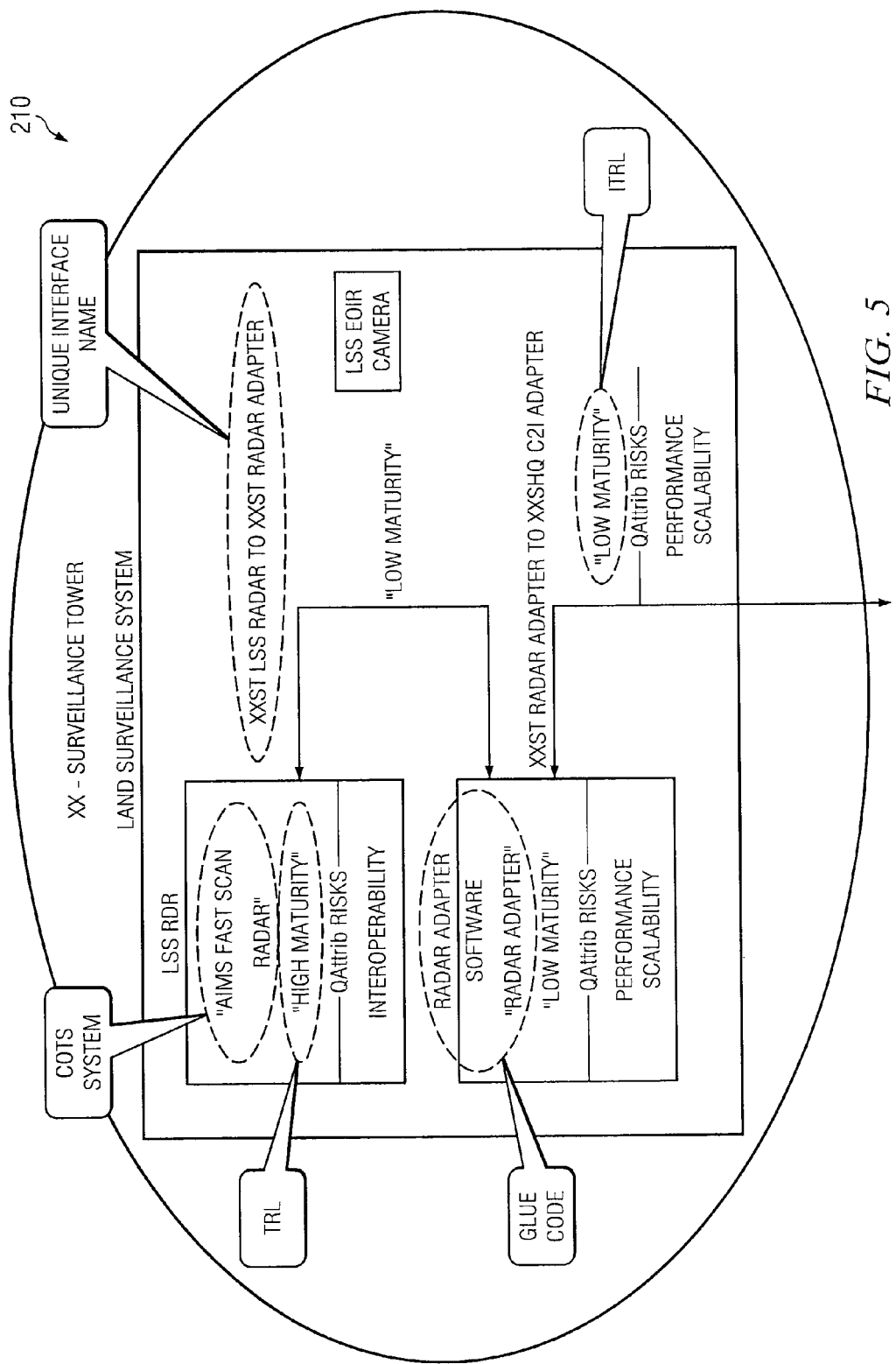
FIG. 5 illustrates an example of an architecture diagram that may be used to display information about integration points.

FIG. 5 illustrates an example diagram 210 that may be used to display information about integration points. In certain embodiments, one or more diagrams 210 may be created to illustrate how system components 30 exchange data at any suitable protocol layer, for example, at the application, network, and/or physical layer. For example, different diagrams may be used to describe data exchange at the application, network, and physical layers.

In certain embodiments, multiple diagrams 210 may be created for different levels. For example, a parent level diagram 210 may show internodal interfaces among nodes, and a node may have a child level diagram 210 that shows the intranodal interfaces of the node.

In the illustrated example, diagram 210 describes integration points that communicate at the application and transport layers. For each system component, diagram 210 identifies the system component, the glue code, and a component maturity level. For each interface, diagram 210 identifies the interface and interface maturity level.

FIG. 6 illustrates an example of a matrix 214 that may be used to display information about integration points. One or more matrices may be created for any suitable protocol layer, for example, application and network layer interfaces.

The matrix may have any constant format. In certain embodiments, system component identifiers may run along both axes. A cell that intersects two system components may be marked to indicate that the components exchange data. In certain embodiments, the matrix may indicate the direction of data flow. For example, the horizontal axis may represent data producers, and the vertical axis may represent data consumers. In the example, the radar glue code (RDR_Glue1) sends data to the track correlator glue code (C2I_Track_Glue1) through four different integration points. The track correlator glue code, however, does not send data to the radar glue code.

In certain embodiments, the system component, glue code, and nodes may be displayed. Intersecting cells represent a unique integration point and may be marked with their maturity levels. In the example, the maturity level for the sector headquarters—surveillance tower integration point is 7. In certain embodiments, each maturity level may be given a color identifying the maturity level.

FIG. 7 illustrates an example of maturity levels 216 that may be used at step 108 of the method of FIG. 4. System interfaces may be assigned an interface maturity level in order to identify potentially risky integration points. In the example, the metric for determining the maturity level is the Technology Readiness Level (TRL) (such as that developed by the U.S. Dept. of Defense), and the metric for determining the interface maturity level is the Interface Technology Readiness Level (ITRL)

The interfaces may be classified according to any suitable classification that has any suitable number of classes. In the illustrated example, interfaces may be classified as low maturity, medium maturity, or high maturity.

a. Low Maturity Interfaces:

ITRL ratings 1-3. In low maturity interfaces, the technology, protocols, and/or data formats may be non-standard or have never been used in a deployed system and are still considered experimental. Low maturity interfaces may be regarded as potentially high risk.

b. Medium Maturity Interfaces:

ITRL ratings 4-6. In medium maturity interfaces, the interface technology, protocols, and/or data formats have been proven to be successful outside of the lab, but may not have been used to interface particular system components of a system.

c. High Maturity Interfaces:

ITRL ratings 7-9. In high maturity interfaces, the technology, protocols, and/or data formats have been used to interface the particular types of system components (for example, the particular COTS product). The use may be in a demonstration version in a system, within a systems integration and/or test lab, or as deployed within a system.

For each integration point, maturity levels may be given to the interface technologies, protocols, and/or data formats used to exchange data at each protocol layer. In certain embodiments, a maturity level may be derived using a function applied to other maturity levels. For example, an overall maturity level for an integration point may be the minimum maturity level of the interface maturity level of the protocol layers of the interface. The maturity level assigned to an interface may evolve during the life of a program.

Modifications, additions, or omissions may be made to the systems (including apparatuses) described herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

What is claimed is:

1. A method comprising:

automatically identifying, using one or more processors, an integration point from one or more diagrams displaying a plurality of nodes each deploying a system component and being assigned to a node type indicating a function or an environment of the node, the plurality of nodes including a first node of a first node type and a second node of a second node type, the integration point associating a plurality of interfaces of a plurality of system components deployed by one or more nodes of the plurality of nodes;

characterizing, using one or more processors, the integration point based at least in part on the node types of the one or more nodes to generate a set of attributes describing the interfaces and compatible with the functions or environments of the one or more nodes, the characterizing including generating a first set of attributes based on determining that the integration point associates a first system component deployed in the first node, and generating a second set of attributes based on determining that the integration point associates a same system component as the first system component deployed in the second node; and specifying, using one or more processors, the integration point according to the set of attributes including the first or second sets of attributes, the specifying including generating a requirement specification for the integration point to be presented to a user, the requirement specification including an identification of the integration point and at least one of a message structure, a communication protocol, or a performance requirement of the integration point.

2. The method of claim 1, wherein the identifying the integration point further comprising:

identifying one or more types of nodes deploying each system component associated by the integration point.

3. The method of claim 1, wherein the characterizing of the integration point further comprises:

characterizing the integration point to indicate a risk level of the integration point.

4. The method of claim 1, wherein the identifying of the integration point further comprises:

identifying each system component as a Commercial Off The Shelf (COTS) component or a custom component.

5. The method of claim 1, wherein the identifying of the integration point further comprises identifying one or more critical data flows, at least one critical data flow of the one or more critical data flows being associated with a lower maturity level, and wherein the characterizing of the integration point further comprises providing a higher priority to the at least one critical data flow.

6. The method of claim 1, wherein the characterizing of the integration point further comprises:

determining a maturity level for one or more protocols layers of the communication protocol.

7. The method of claim 1, wherein the characterizing of the integration point further comprises:

determining a maturity level for each interface of the plurality of interfaces.

8. The method of claim 1, wherein the characterizing of the integration point further comprises:
characterizing a maturity level for each system component of the plurality of system components.

9. The method of claim 1, wherein the generating of the requirement specification comprises:
generating a separate report for one or more requirements for each of one or more protocol layers of the communication protocol.

10. One or more non-transitory computer readable storage media embodied with computer code, when executed by a computer, operable to:
automatically identify an integration point from one or more diagrams displaying a plurality of nodes each deploying a system component and being assigned to a node type indicating a function or an environment of the node, the plurality of nodes including a first node of a first node type and a second node of a second node type, the integration point associating a plurality of interfaces of a plurality of system components deployed by one or more nodes of the plurality of nodes;
characterize the integration point based at least in part on according to the node types of the one or more nodes to generate a set of attributes describing the interfaces and compatible with the functions or environments of the one or more nodes, the characterizing including generating a first set of attributes based on determining that the integration point associates a first system component deployed in the first node, and generating a second set of attributes based on determining that the integration point associates a same system component as the first system component deployed in the second node; and
specify the integration point according to the set of attributes including the first or second sets of attributes, the specifying including generating a requirement specification for the integration point to be presented to a user, the requirement specification including an identification of the integration point and at least one of a message structure, a communication protocol, or a performance requirement of the integration point.

11. The computer readable media of claim 10, wherein the computer code, when executed by the computer, is operable to:
identify one or more types of nodes deploying each system component associated by the integration point.

12. The computer readable media of claim 10, wherein the computer code, when executed by the computer, is operable to:
characterize the integration point to indicate a risk level of the integration point.

13. The computer readable media of claim 10, wherein the computer code, when executed by the computer, is operable to:
identify each system component as a Commercial Off The Shelf (COTS) component or a custom component.

14. The computer readable media of claim 10, wherein the computer code, when executed by the computer, is operable to:
identify one or more critical data flows, at least one critical data flow of the one or more critical data flows associated with a lower maturity level; and
provide a higher priority to the at least one critical data flow.

15. The computer readable media of claim 10, wherein the computer code, when executed by the computer, is operable to:
determine a maturity level for one or more protocols layers of the communication protocol.

16. The computer readable media of claim 10, wherein the computer code, when executed by the computer, is operable to:
determine a maturity level for each interface of the plurality of interfaces.

17. The computer readable media of claim 10, wherein the computer code, when executed by the computer, is operable to:
characterize a maturity level for each system component of the plurality of system components.

18. The computer readable media of claim 10, wherein the computer code, when executed by the computer, is operable to:
generate, as part of the requirement specification, a separate report for each of one or more protocol layers of the communication protocol.

19. An apparatus comprising:
memory to store information with respect to a system comprising a plurality of nodes each deploying a system component and being assigned to a node type indicating a function or an environment of the node; and
one or more processors to execute an integration point specifying module configured to:
display one or more diagrams comprising at least a portion of the plurality of nodes, the at least portion including a first node of a first node type and a second node of a second node type;
automatically identify an integration point from the one or more diagrams being displayed, the integration point associating a plurality of interfaces of a plurality of system components deployed by one or more nodes of the plurality of nodes;
characterize the integration point based at least in part on the node types of the one or more nodes to generate a set of attributes describing the interfaces and compatible with the functions or environments of the one or more nodes, the characterizing including generating a first set of attributes based on determining that the integration point associates a first system component deployed in the first node, and generating a second set of attributes based on determining that the integration point associates a same system component as the first system component deployed in the second node; and
specify the integration point according to the set of attributes including the first or second sets of attributes, the specifying including generating a requirement specification for the integration point to be presented to a user, the requirement specification including an identification of the integration point and at least one of a message structure, a communication protocol, or a performance requirement of the integration point.

20. The apparatus of claim 19, wherein the integration point specifying module is configured to:
calculate a maturity level of the integration point as a function of maturity levels each assigned to a corresponding one of the plurality of interfaces; and
determine whether to specify the integration point based on the maturity level of the integration point reaching a specified level.

* * * * *

UNITED STATES PATENT AND TRADEMARK OFFICE
CERTIFICATE OF CORRECTION

| | | |
|---|---|---|
| PATENT NO. | : 8,413,115 B1 | Page 1 of 1 |
| APPLICATION NO. | : 12/548481 | |
| DATED | : April 2, 2013 | |
| INVENTOR(S) | : Surprise et al. | |

It is certified that error appears in the above-identified patent and that said Letters Patent is hereby corrected as shown below:

Title Page, in column 2, under "Other Publications", line 3, delete "M" and insert --M.--, therefor Title Page, in column 2, under "Other Publications", line 5, delete "S" and insert --S.--, therefor In the Specification In column 4, line 49, after "point", insert --.--, therefor In column 4, line 64, after "EXCEL", insert --.--, therefor In column 8, line 66, delete "214" and insert --216--, therefor In column 9, line 29, after "(ITRL)", insert --.--, therefor Signed and Sealed this
Twelfth Day of November, 2013

Teresa Stanek Rea
*Deputy Director of the United States Patent and Trademark Office*